US011481280B2

(12) United States Patent
Meunier et al.

(10) Patent No.: US 11,481,280 B2
(45) Date of Patent: Oct. 25, 2022

(54) MCU-INDEPENDENT PRIMARY-SECONDARY PMIC SEQUENCING AND CENTRALIZED FAULT MANAGEMENT

(71) Applicant: NXP USA, Inc., Austin, TX (US)

(72) Inventors: Jean-Philippe Meunier, Ayguesvives (FR); Maxime Clairet, Labastidette (FR); Guillaume Jean Founaud, Saint-Orens de Gameville (FR); Alaa Eldin Y El Sherif, Plano, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/228,967

(22) Filed: Apr. 13, 2021

(65) Prior Publication Data

US 2022/0253358 A1  Aug. 11, 2022

(30) Foreign Application Priority Data

Feb. 11, 2021  (EP) ..................... 21305181

(51) Int. Cl.
*G06F 11/14* (2006.01)
*G06F 13/40* (2006.01)
(Continued)

(52) U.S. Cl.
CPC ............ *G06F 11/1441* (2013.01); *G06F 1/30* (2013.01); *G06F 11/0736* (2013.01);
(Continued)

(58) Field of Classification Search
CPC ............ G06F 11/0736; G06F 11/0751; G06F 11/0766; G06F 11/0772; G06F 11/0778;
(Continued)

(56) References Cited

U.S. PATENT DOCUMENTS 9,939,877 B2   4/2018  Varkki et al.
2007/0230225 A1*  10/2007  Tsukamoto ....... H02J 13/00002
363/65

(Continued)

FOREIGN PATENT DOCUMENTS

DE          10246914 A1 *  4/2004  ............ G06F 11/221

OTHER PUBLICATIONS

Lagardell, Vincent et al., Scalable & Safe Power Management Solutions Overview, Oct. 2018, NXP, Retrieved from Internet < https://community.nxp.com/t5/Technology-Days-Training/Scalable-and-Safe-Power-Management-Solutions-for-Automotive/ta-p/1104318> (Year: 2018).*

*Primary Examiner* — Bryce P Bonzo
*Assistant Examiner* — Albert Li

(57) ABSTRACT

Various embodiments relate to a distributed power system, including: a primary power management integrated circuit (PMIC) configured to receive a source voltage and connected to a primary communication bus, wherein the primary PMIC produces a secondary voltage on a voltage line, wherein the primary PMIC communicates with a microcontroller unit (MCU) via the primary communication bus; and a plurality of secondary PMICs connected to the primary PMIC via the voltage line, a secondary communication bus, and a fail line, wherein the plurality of secondary PMICs are configured to produce a pulsed signal on the fail line when a secondary PMIC fails, wherein the pulsed signal produced by each of the plurality of secondary PMICs have a unique pulse width that indicates to the primary PMIC the identity of the failed secondary PMIC.

22 Claims, 8 Drawing Sheets

(51) Int. Cl.
*G06F 11/07* (2006.01)
*G06F 1/30* (2006.01)

(52) U.S. Cl.
CPC ...... *G06F 11/0751* (2013.01); *G06F 11/0772* (2013.01); *G06F 11/0778* (2013.01); *G06F 11/0784* (2013.01); *G06F 11/0787* (2013.01); *G06F 13/4068* (2013.01); *G06F 2201/805* (2013.01)

(58) Field of Classification Search
CPC ............ G06F 11/0784; G06F 11/0787; G06F 11/1441; G06F 1/24; G06F 1/26; G06F 1/263; G06F 1/266; G06F 1/30; G06F 1/305; G06F 13/36; G06F 13/368; G06F 13/376; G06F 13/378
See application file for complete search history.

(56) References Cited

U.S. PATENT DOCUMENTS

| | | | |
|---|---|---|---|
| 2008/0125919 A1* | 5/2008 | Takeuchi | G06F 13/362 701/1 |
| 2014/0143588 A1* | 5/2014 | Leinonen | G06F 11/0742 714/2 |
| 2015/0370296 A1* | 12/2015 | Purcell | G06F 11/221 714/43 |
| 2017/0153680 A1 | 6/2017 | Girard et al. | |
| 2018/0336149 A1* | 11/2018 | Petersen | G06F 11/0706 |
| 2019/0064910 A1* | 2/2019 | Wang | G06F 1/3206 |
| 2019/0250697 A1* | 8/2019 | Mocanu | G06F 3/0659 |
| 2021/0271276 A1* | 9/2021 | Seok | G06F 1/26 |

* cited by examiner

MCU-INDEPENDENT PRIMARY-SECONDARY PMIC SEQUENCING AND CENTRALIZED FAULT MANAGEMENT

TECHNICAL FIELD

Various exemplary embodiments disclosed herein relate generally to microcontroller unit (MCU) independent primary-secondary power management integrated circuit (PMIC) sequencing and centralized fault management.

BACKGROUND

Because of the complexity of the automotive systems design requiring high performance computing systems on chip (SOC) and peripherals, the number of power supply rails for a given application has increased significantly. This problems has arisen in other applications as well. A distributed power architecture with two conversion stages including one PMIC connected to the battery (primary PMIC) supplying power to several lower voltage Point-of-Load PMICs (secondary PMICs) is a commonly used approach.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a distributed power system, including: a primary power management integrated circuit (PMIC) configured to receive a source voltage and connected to a primary communication bus, wherein the primary PMIC produces a secondary voltage on a voltage line, wherein the primary PMIC communicates with a microcontroller unit (MCU) via the primary communication bus; and a plurality of secondary PMICs connected to the primary PMIC via the voltage line, a secondary communication bus, and a fail line, wherein the plurality of secondary PMICs are configured to produce a pulsed signal on the fail line when a secondary PMIC fails, wherein the pulsed signal produced by each of the plurality of secondary PMICs have a unique pulse width that indicates to the primary PMIC the identity of the failed secondary PMIC.

Various embodiments are described, wherein the primary PMIC and secondary PMICs each include a fail pin connected to the fail line, and the fail line is a single line.

Various embodiments are described, wherein the primary PMIC is configured to produce a reset signal on a reset line connected to the MCU.

Various embodiments are described, wherein the primary PMIC is configured to produce an interrupt signal on an interrupt line connected to the MCU.

Various embodiments are described, wherein each of the secondary PMICs is configured to communicate with the MCU via the secondary communication bus, the primary PMIC, and the primary communication bus.

Various embodiments are described, wherein each of the primary PMIC and the plurality of secondary PMICs include control logic configured to monitor the fail line and to produce the pulsed signal.

Various embodiments are described, wherein the plurality of secondary PMICs are configured to: determine the status of the fail line before transmitting the pulsed signal; and transmit the pulsed signal when the fail line is not asserted.

Various embodiments are described, wherein the plurality of secondary PMICs are configured to: determine the status of the fail line before transmitting the pulsed signal; wait a predetermined period of time when the fail line is asserted and then again detect the status of the fail line; and transmit the pulsed signal when the fail line is not asserted.

Various embodiments are described, wherein the plurality of secondary PMICs are configured to determine the status of the fail line after transmitting the pulsed signal.

Various embodiments are described, wherein the plurality of secondary PMICs are configured to wait a predetermined period of time when it is determined that the fail line is asserted and then transmit the pulsed signal.

Various embodiments are described, wherein the plurality of secondary PMICs are configured to: determine the status of the fail line before transmitting the pulsed signal; transmit the pulsed signal when the fail line is not asserted; wait a first predetermined period of time when the fail line is asserted and then again detect the status of the fail line; transmit the pulsed signal when the fail line is not asserted after waiting the first predetermined period of time; and determine the status of the fail line after transmitting the pulsed signal after waiting the first predetermined period of time.

Various embodiments are described, wherein the plurality of secondary PMICs are configured to wait a second predetermined period of time when it is determined that the fail line is asserted after transmitting the pulsed signal and then again transmit the pulsed signal.

Various embodiments are described, wherein the primary PMIC and plurality of secondary PMICs are configured to power-down in a predetermined sequence with a pulsed signal with a pulse width of a predetermined length is asserted on the fail line.

Various embodiments are described, wherein the predetermined length is greater than the unique pulse widths of each of the plurality of pulsed signals produced by the plurality of secondary PMICs.

Various embodiments are described, wherein the primary PMIC and plurality of secondary PMICs are configured to: each assert a signal on the fail line; and power-up in a predetermined sequence with when each of the primary PMIC and the plurality of PMICs deassert the signal on the fail line.

Various embodiments are described, further including: a register configured to store a fail flag for each of the plurality of secondary PMICs, wherein the primary PMIC is configured to determine the pulse width of pulsed signals on the fail line and set a fail flag in the register corresponding to a failed secondary PMIC.

Various embodiments are described, wherein the primary PMIC is configured to send an interrupt signal to the MCU when a fail flag is set in the register.

Various embodiments are described, wherein each of the secondary PMICs is configured to communicate with the MCU via the secondary communication bus, the primary PMIC, and the primary communication bus, and the MCU is configured to obtain failure status from the failed secondary PMIC via the primary communication bus, primary PMIC, and secondary communication bus.

Various embodiments are described, further including: a register bank configured to store a fail flag and failure information for each of the plurality of secondary PMICs, wherein the primary PMIC is configured to determine the pulse width of pulsed signals on the fail line and set a fail flag in the register corresponding to a failed secondary PMIC, and wherein the primary PMIC is configured to read failure information from the failed secondary PMIC and stores it in the register bank.

Various embodiments are described, wherein the primary PMIC is configured to send an interrupt signal to the MCU when a fail flag is set in the register, and wherein the MCU obtains failure status from primary PMIC via the primary communication bus.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
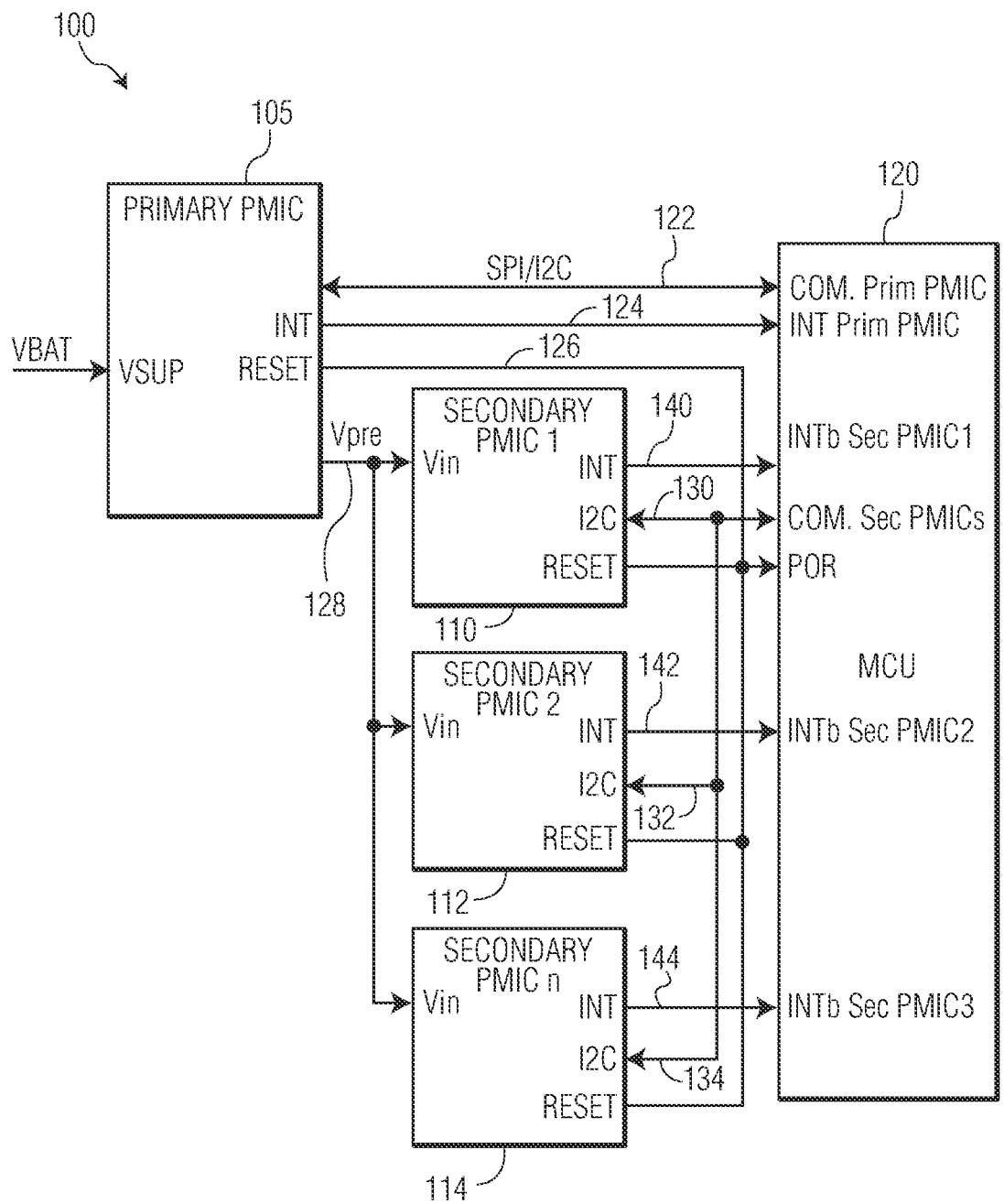
FIG. 1 illustrates a distributed power architecture with two stages.

FIG. 1 illustrates a distributed power architecture with two stages. Distributed power system 100 includes a primary power management integrated circuit (PMIC) 105, secondary PMICs 110, 112, 114, and a microcontroller unit (MCU) or system on chip (SOC) 120. In the description below an MCU is described, but instead the MCU may be replaced by an SOC as well. The primary PMIC 105 is connected to the battery and receives a voltage VBAT. In the automotive application VBAT will be about 12V, but in this and other applications it may be other values. The primary PMIC 105 produces a pre-regulation or secondary voltage Vpre that is provided to each of the secondary PMICs 110, 112, 114. This may be for example 5V, but other voltage values are possible. The primary PMIC 105 may communicate with the MCU or SOC over a primary bus 122. The primary bus 122 may use the serial peripheral interface (SPI) protocol or the inter-integrated circuit (I2C) protocol, but other protocols may be used as well. The primary bus 122 may allow for the MCU 120 to provide commands and controls to the primary PMIC 105 and to receive status information from the primary PMIC 105. The primary PMIC 105 also may produce an interrupt signal on an interrupt line 124. This interrupt signal may interrupt the operation of the MCU 120 so that it can attend to urgent situations such as a failure of the primary PMIC 105. Further, the primary PMIC 105 produces a reset signal on a reset line 126. The reset line is connected to each of the secondary PMICs 110, 112, 114 and the MCU 120. When the primary PMIC 105 asserts the reset signal each of the PMICs 110, 112, 114 and the MCU 120 are reset.

FIG. 1 illustrates three secondary PMICs 110, 112, 114, but fewer or more PMICs may be used in the distributed power system 100. The secondary PMICs 110, 112, 114 receive Vpre as an input voltage that then may be further regulated to produce a voltage used to power various subsystems in a system to be powered by the distributed power system 100. The secondary PMICs 110, 112, 114 may communicate with the MCU over a secondary busses 130, 132, 134. These secondary busses 130, 132, 134 may be SPI, I2C, or other types of busses. The secondary busses 130, 132, 134 may allow for the MCU 120 to provide commands and controls to the secondary PMICs 110, 112, 114 as well as receive status information from the secondary PMICs 110, 112, 114. The secondary PMICs 110, 112, 114 may produce an interrupt on secondary interrupt lines 140, 142, 144 to the MCU 120. These interrupts function similar to the interrupt produced by the primary PMIC 105. Further, each of the secondary PMICs 110, 112, 114 are connected to the reset line 126 and may be reset as needed by the primary PMIC 105. Further, the reset line 126 is connected to the MCU 120 and may reset the MCU 120 in case of a fault.

As shown in FIG. 1, the primary PMIC 105 and the secondary PMICs 110, 112, 114 are connected to the MCU 120. This allows the MCU 120 to run diagnostics when a secondary PMIC fails and to take the full control of the complete PMICs solution. In other situations, the MCU 120 may need to update the software or configuration of one of the PMICs. As a result, the MCU 120 needs to be connected individually to all the PMICs using a communication protocol as illustrated. This significantly increases the board layout complexity but also the software development efforts and the number of software modules needed to address independently the different PMICs. In addition, the interruption and priority strategy between the MCU and all the PMICs as well as system integration becomes much more complex.

Embodiments will now be described that introduce a scalable primary-secondary distributed power supply architecture that offers autonomous power sequencing, fault management, and diagnostics with a simplified MCU-PMIC interface and software development. The primary PMIC independently manages the power-up, power-down and sequencing of the secondary PMICs and supervises and provides status of the entire power supply rails with detailed fault-bit-streaming option via a special bus to the secondary PMICs. Through communicating only to the primary PMIC, the MCU has full access to the entire primary-secondary distributed power supply.

Figure 2:
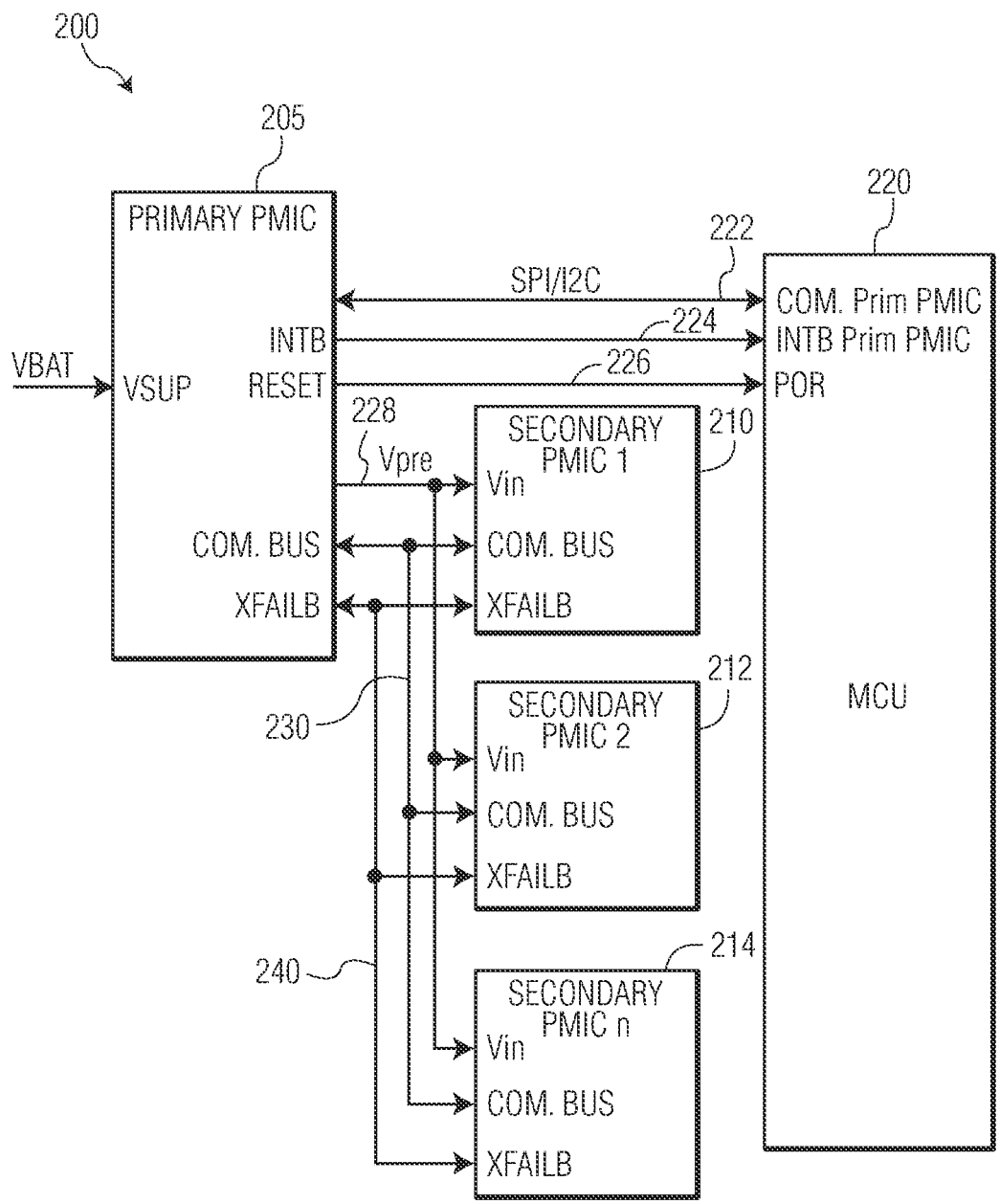
FIG. 2 illustrates an embodiment of a distributed power system with two stages.

FIG. 2 illustrates an embodiment of a distributed power system with two stages. Distributed power system 200 includes a primary PMIC 205, secondary PMICs 210, 212, 214, and a MCU or SOC 220. In the description below an MCU is described, but instead the MCU may be replaced by an SOC as well. The primary PMIC 205 is connected to the battery and receives a voltage VBAT. The primary PMIC 205 produces a pre-regulation or secondary voltage Vpre that is provided to each of the secondary PMICs 210, 212, 214. The primary PMIC 205 may communicate with the MCU 220 over a primary bus 222. The primary bus 222 may use the SPI protocol or I2C protocol, but other protocols may be used as well. The primary bus 222 may allow for the MCU 220 to provide commands and controls to the primary PMIC 205 and to receive status information from the primary PMIC 205. The primary PMIC 205 also may produce an interrupt signal on an interrupt line 224. This interrupt signal may indicate to the MCU 220 that a failure has occurred in the distributed power system 200. Further, the primary PMIC 205 produces a reset signal on a reset line 226. The reset line is connected to the MCU 220. When the primary PMIC 205 asserts the reset signal the MCU 220 is reset.

The primary PMIC 205 is also connected to each of the secondary PMICs 210, 212, 214 using a secondary bus 230. The secondary bus 230 may use the SPI, I2C, or any other protocol. The secondary bus allows for the communication of a wide variety of information between the primary PMIC 205 and each of the secondary PMICs 210, 212, 214. The secondary bus 230 may allow for the primary PMIC 205 to provide commands and controls for the secondary PMICs 210, 212, 214 and to receive status information from the primary PMIC 205. The secondary bus 230 allows for a gateway function that allows the MCU 230 to communicate directly with each secondary PMIC 210, 212, 214.

The primary PMIC 205 also includes a single pin XFAILB. The XFAILB pin on the primary PMIC 205 is connected to a single XFAILB pin on each of the secondary PMICs 210, 212, 214 using a single XFAILB or failure line 240. The XFAILB line 240 is used to determine when one the secondary PMICs 210, 212, 214 fails and may be used to carry out other functions such as power-up or power-down sequence for the distributed power system 200. This will be described in more detail below.

FIG. 2 illustrates three secondary PMICs 210, 212, 214, but fewer or more PMICs may be used in the distributed power system 200. The secondary PMICs 210, 212, 214 receive Vpre as an input voltage that then may be further regulated to produce a voltage used to power various subsystems in a system to be powered by the distributed power system 200. The secondary PMICs 210, 212, 214 may communicate with the primary PMIC 205 over a secondary bus 230. The secondary bus 230 may allow for the primary PMIC 205 to provide commands and controls to the secondary PMICs 210, 212, 214 and to receive status information from the primary PMIC 205. Each of the secondary PMICs 210, 212, 214 include an XFAILB pin connected to the XFAILB line 240, and the XFAILB pin is used to indicate failures and to carry out other functions.

In the distributed power system 200 illustrated in in FIG. 2, the interaction and interface of MCU 210 is limited to the primary PMIC 205. No more direct interactions are required between the secondary PMICs 210, 212, 214 and the MCU 220 to achieve complete fault management and comprehensive system diagnostic coverage. Further, there is no interruption signal connections from the secondary PMICs 210, 212, 214 to the MCU 220, and only one global reset signal is provided from the primary PMIC 205 to the MCU 220. Also, the MCU 210 only communicates with the primary PMIC 205 and does not need to independently address each secondary PMIC to get the full diagnostic and control of the distributed power system 200.

The primary PMIC 205 informs the MCU 220 about when one of the secondary PMICs 210, 212, 214 fails, and the primary PMIC 205 identifies which one of the secondary PMICs 210, 212, 214 is failing and obtains details from the faulty secondary PMIC via the secondary bus 230.

This primary-secondary PMIC architecture also facilitates automatic power-up and power-down sequence, which may be managed by the dedicated XFAILB pins and the XFAIL line 240. While the XFAILB line 240 is described herein as a single line, it may be extended to other types of connections like dual wires, communication protocol, etc.

The two stage architecture of the distributed power system 200 has the following benefits: reduction in the electrical connections and communications between the MCU and all PMICs (primary and secondary) to only one primary PMIC; providing the MCU failure indications of secondary PMIC(s) using only one communication bus between the primary PMIC and MCU; eliminating the need for the MCU to communicate directly with every secondary PMIC; implementing a gateway function so that the MCU may communicate with the secondary PMICs via communication bus between MCU and primary PMIC, which may dramatically simplify the software development efforts; and providing an automatic and synchronized power-up and power-down sequence driven by the primary PMIC without the need of external controller or MCU interactions with the secondary PMICs.

The primary PMIC 205 receives indications of failures of the secondary PMICs 210, 212, 214 using the XFAILB line 240. The following steps describe the interaction between the primary and secondary PMICs and the MCU when a fault occurs. First, the primary PMIC 205 identifies which of the secondary PMICs 210, 212, 214 has failed. When a secondary PMIC is failing, it will generate a pulse with a predefined duration on the XFAILB line 240, which is monitored by the primary PMIC 205. As each different secondary PMIC generates a pulse with a unique width, the primary PMIC 205 is able to determine which of the secondary PMICs 210, 212, 214 is failing. For example, secondary PMIC 210 generates a pulse of length 1×10 us, secondary PMIC 212 generates a pulse of length 2×10 us=20 us, and secondary PMIC 214 generates a pulse of N×10 us. Note that the duration of 10 us is used as an example and can be replaced by another duration according to system requirements. In other embodiments the lengths could be 10 us+N×2 us for example, where there is a minimum length pulse duration and that length is incremented by a different value (2 us in this example). Again the values of 10 us and 2 us are just examples and other values may be used as well.

The identifier of the secondary PMIC or length of the pulse produced may be set using one-time programming (OTP) and so the pulse length is fixed for a dedicated system and cannot be changed by software. In other embodiments, these lengths may be programed by either the primary PMIC 205 or the MCU 220.

Figure 3:
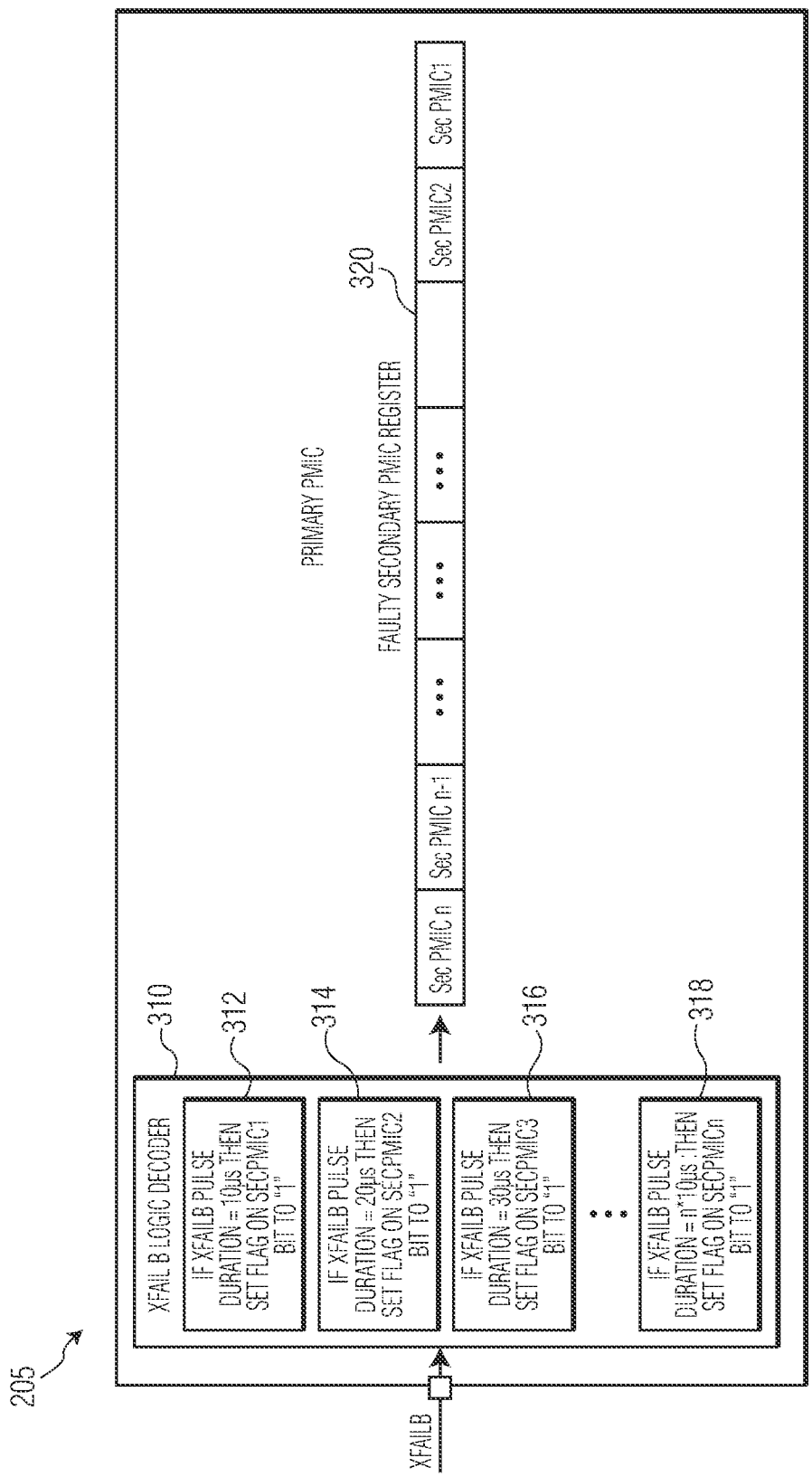
FIG. 3 illustrates a logic decoder and a faulty secondary PMIC register.

Because of the XFAILB signal pulse duration, the primary PMIC knows exactly which one of the secondary PMICs is failing and stores the information in a dedicated register that the MCU may read for diagnostic purposes. FIG. 3 illustrates a logic decoder and a faulty secondary PMIC register. The logic decoder 310 include various logic to determine the length of a pulse on the XFAILB line and then to set values in a register. For example, logic 312 determines if a pulse on the XFAILB line is 10 us long, and then sets bit for SECPMIC1 indicating a failure of a first secondary PMIC. Logic 314, 316, 320 performs a similar test for lengths of 20 us, 30 us, and n 10 us, respectively, and will set the failure bits for the associated secondary PMICs. A faulty secondary PMIC register 320 may store these failure bits for each of the secondary PMICs. The faulty secondary PMIC register 320 may be accessed by the MCU to determine which secondary PMICs have failed. The MCU 220 may do this using the primary bus 222. When the primary PMIC 205 determines that a failure has occurred, the primary PMIC 205 will send an interrupt signal to the MCU 220 and will transition the system into a safe state (if required) by asserting a dedicated safety pin.

Figure 4:
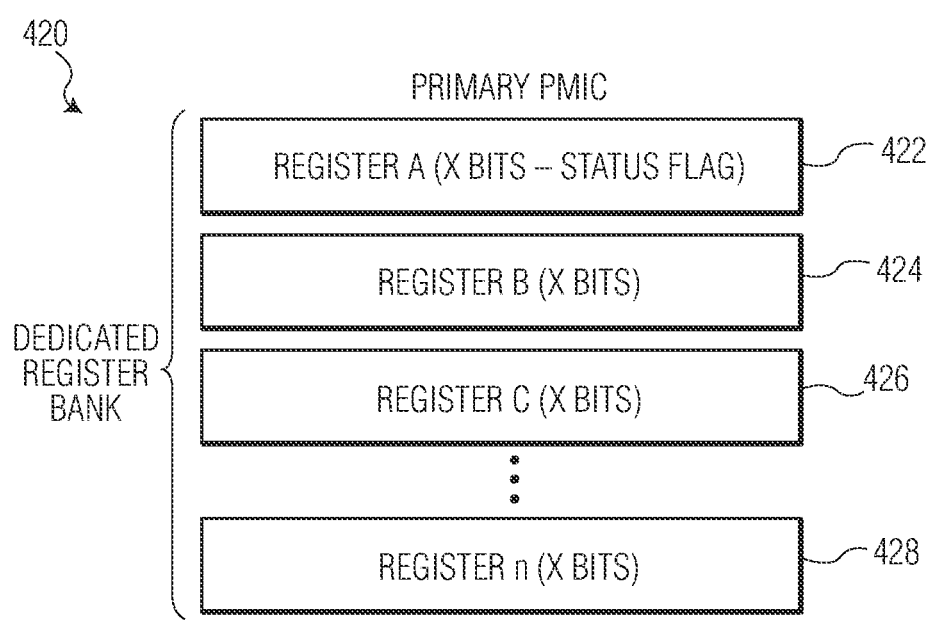
FIG. 4 illustrates a register bank for storing various fault data for the secondary PMICs.

FIG. 4 illustrates a register bank for storing various fault data for the secondary PMICs. The primary PMIC 205 may include a register bank 420 that stores various fault flags for each of the different secondary PMICs. The register bank 420 is an alternative way to store failure information. For example, the register bank 420 may include n registers 422, 424, 426, 428, where n is the number of secondary PMICs. Each of the registers 422, 424, 426, 428 may include x bits. The various bits may indicate different sorts of failures or conditions such as for example, overvoltage, undervoltage, current limit, thermal shutdown, etc. This additional data may also be read by the MCU 220 using the primary bus 222.

When the primary PMIC 205 detects a failure, the primary PMIC 205 may send an interrupt signal on the interrupt line 224 that indicates a problem in the distributed power system 200. In response, the MCU 220 may determine the cause of the failure by reading the diagnostic flags available within the primary PMIC registers 420. Alternatively, the MCU 320 may communicate with the faulty secondary PMIC through the primary PMIC gateway function based upon diagnostic flags in faulty secondary PMIC register 320. In this situation, the primary PMIC 205 serves as a gateway by connecting the MCU 220 to the failing secondary PMIC so that the MCU 220 may have access to the secondary PMICs. Using the gateway function, the MCU 220 can then take actions directly on the faulty secondary PMIC such as turning off the secondary PMIC in fault or recovering a secondary PMIC which has been switched off previously.

Figure 5:
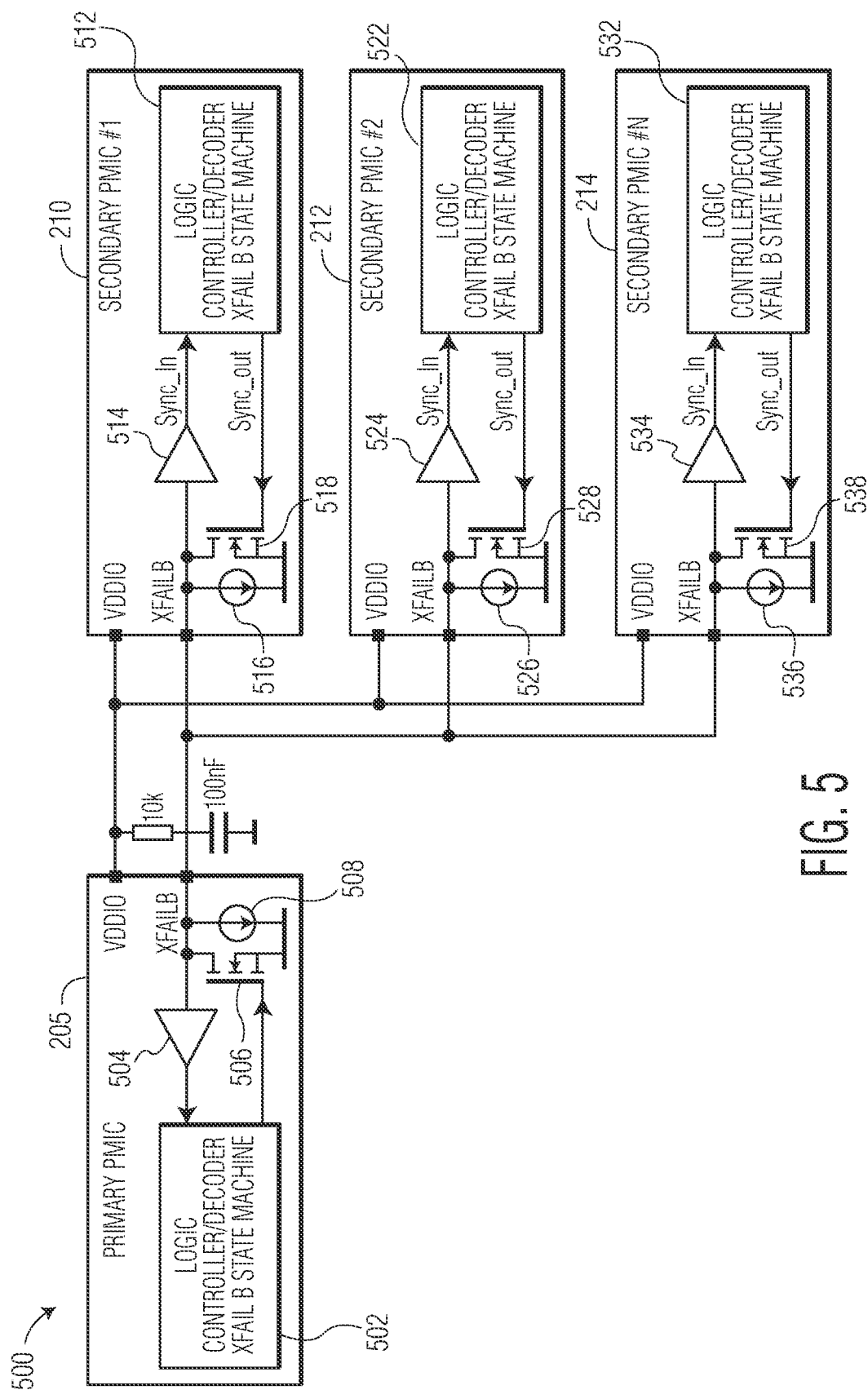
FIG. 5 illustrates another view of the power distributions system.

The XFAILB line 240 may be used to implement other features in the distributed power system 200. FIG. 5 illustrates another view of the power distributions system. Part of the internal structure of the master PMIC 205 and each of the secondary PMICs 210, 212, 214 are shown. Each of the PMICs include current source 508, 518, 528, 538 and a transistor 506, 516, 526, 536 that is controlled to pull the XFAILB line down. Each PMIC also includes a buffer 504, 514, 524, 534 that buffers the received XFAILB signal from the XFAILB line 240. The buffered XFAILB signal is then fed into a logic controller 502, 512, 522, 532. These logic controllers 502, 512, 522, 532 may include a state machine, but other logic architectures and implementations may be used as well. These logic controllers 502, 512, 522, 532 implement logic to carry out the various functions described herein regarding using the XFAILB line 240 to control and monitor various aspects of the distributed power system 200. The logic controllers 502, 512, 522, 532 then control the transistors 506, 516, 526, 536 so as to change the signal present on the XFAILB line 240.

The XFAILB line 240 may be used to implement other additional features in different system modes that may be controlled by the logic controllers in each of the PMICs. First, an XFAILB conflict management may be implemented when several PMICs assert a signal at the same time on their XFAILB pins. Second, the XFAILB line may be used to synchronize the power-up sequence during application power-up. Third, the XFAILB line may be used to synchronize the power-down sequence during application power-down, which may, for example, be requested by the MCU or following a critical system failure.

Figure 6:
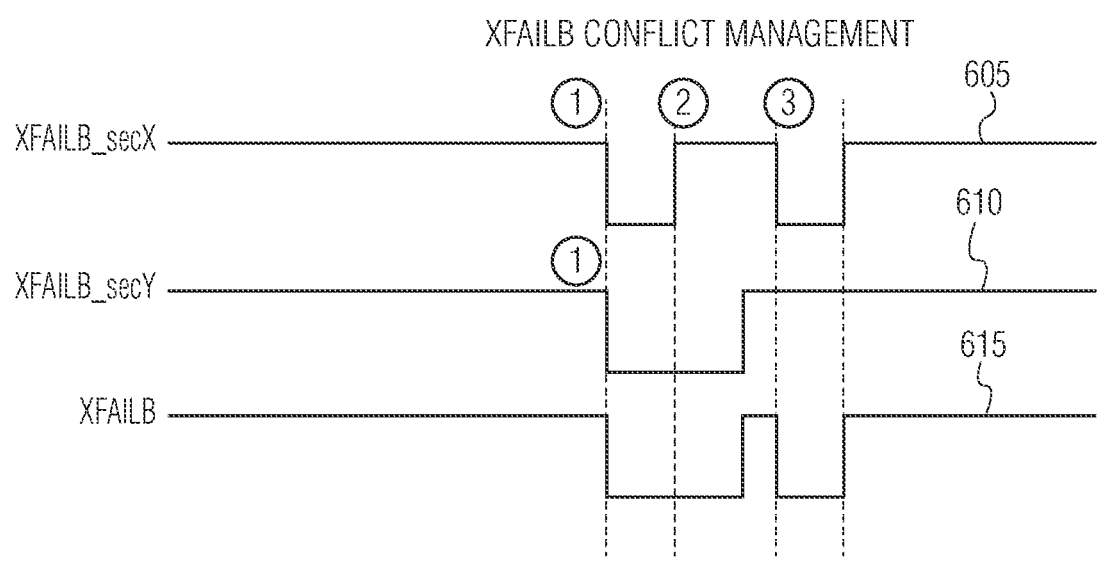
FIG. 6 illustrates the signal present at two different secondary PMICs and the resulting XFAILB signal.

It is possible in some situations that several secondary PMICs assert their respective XFAILB pins at the same time to inform the primary PMIC of a failure. In this condition, the primary PMIC will take the PMIC with the longer pulse duration as the one having a failure but will miss the secondary PMIC with a shorter pulse duration, when the shorter pulse duration falls within the longer pulse duration. FIG. 6 illustrates the signal present at two different secondary PMICs and the resulting XFAILB signal. The first plot 605 shows the signal XFAILB_secX asserted at a first secondary PMIC. The second plot 610 shows the signal XFAILB_secY asserted at a second secondary PMIC. The third plot 615 shows the resulting signal on the XFAILB line 240. At time 1, both the first and second secondary PMICs assert their XFAILB pin. The resulting XFAILB signal is interpreted as a failure at the second secondary PMIC because the signal from the first secondary PMIC is within the signal from the second secondary PMIC and cannot be detected.

For the primary PMIC to be able to understand that there are several secondary PMICs in fault, each secondary PMIC may have the capability of monitoring the state of the XFAILB pin and to assert its XFAILB pin when global XFAILB signal is released.

In FIG. 6 at time 2 when the first secondary PMIC releases its XFAILB pin, the first secondary PMIC determines if the XFAILB line is still asserted. If so, then another secondary PMIC is asserting its XFAILB pin. Accordingly, the first secondary PMIC will wait a predetermined length of time and assert its XFAILB pin again, for example at time 3 in FIG. 6. This second assertion by the first secondary PMIC is now correctly detected and interpreted by the primary PMIC. Accordingly, the master PMIC will detect the two different failures from the different secondary PMICs.

Figure 7:
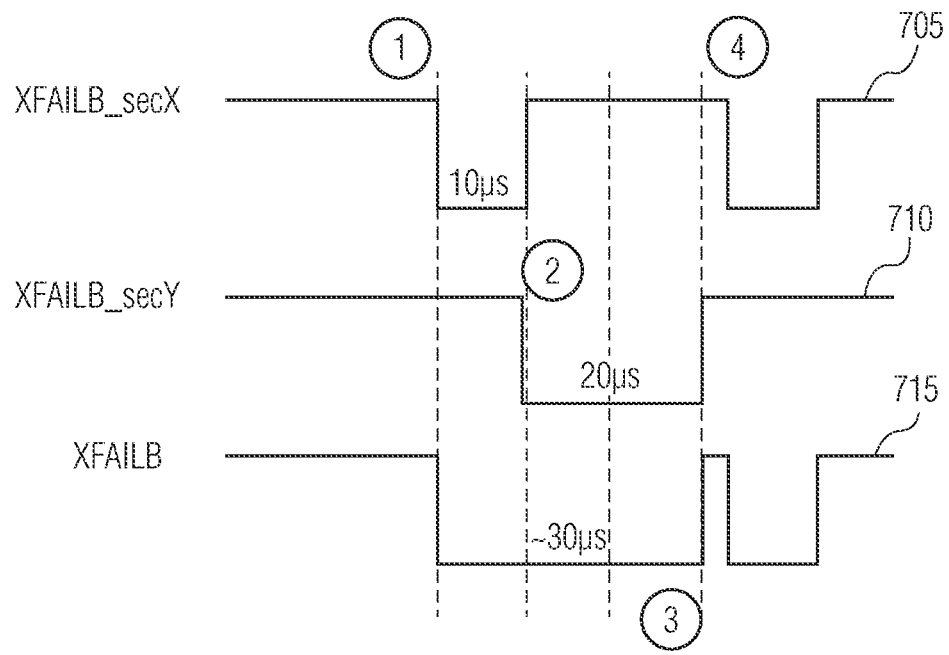
FIG. 7 illustrates another situation where the master PMIC may misinterpret the signals from two secondary PMICS.

FIG. 7 illustrates another situation where the master PMIC may misinterpret the signals from two secondary PMICS. The first plot 705 shows the signal XFAILB_secX asserted at a first secondary PMIC. The second plot 710 shows the signal XFAILB_secY asserted at a second secondary PMIC. The third plot 715 shows the resulting signal on the XFAILB line 240. At time 1, the first secondary PMIC asserts it XFAILB pin for 10 us. Then at a time 2, which is just before the end of the pulse from the first secondary PMIC, the second secondary PMIC asserts its XFAIL pin for 20 us. When the first secondary PMIC ends its pulse it determines that the XFAILB line is still asserted. Accordingly, the first secondary PMIC waits until time 4 and asserts is XFAILB pin again. The signal 715 seen on the XFAILB line includes a 30 us pulse and a second 10 us pulse. The 10 us pulse is interpreted correctly, but the 30 us pulse is interpreted as a failure of a third secondary PMIC that uses a 30 us pulse. As a result, the failure of the second secondary PMIC is not detected, and a failure of a third secondary PMIC is falsely detected.

Figure 8:
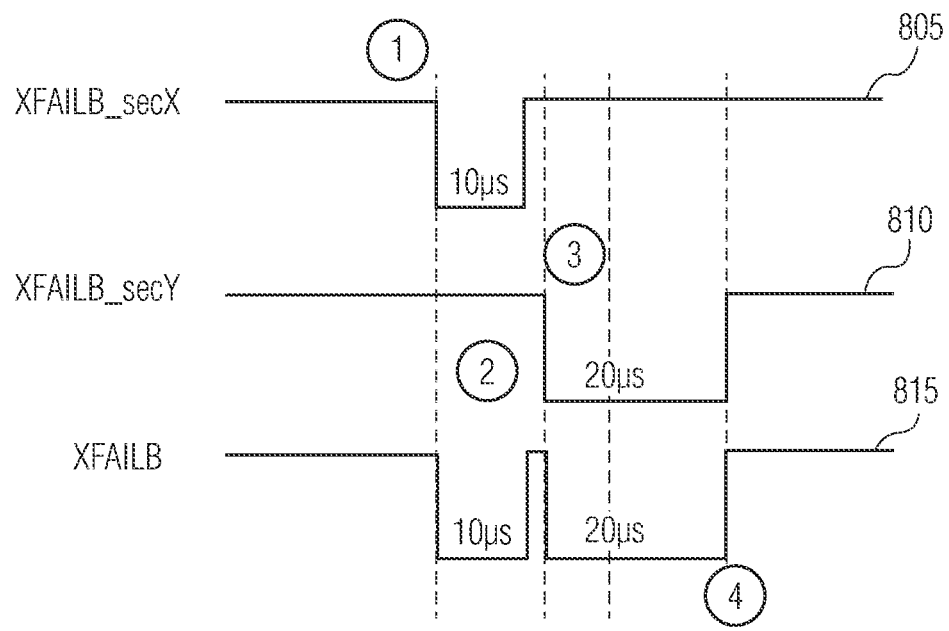
FIG. 8 illustrates how the problem illustrated in FIG. 7 may be overcome by a secondary PMIC checking the status of the XFAILB line before asserting its XFAILB pin.

In order to prevent this confusion in the timing seen by the primary PMIC, the secondary PMICs may also check the availability of the XFAILB line before asserting its XFAILB pin on the line. FIG. 8 illustrates how the problem illustrated in FIG. 7 may be overcome by a secondary PMIC checking the status of the XFAILB line before asserting its XFAILB pin. The first plot 805 shows the signal XFAILB_secX asserted at a first secondary PMIC. The second plot 810 shows the signal XFAILB_secY asserted at a second secondary PMIC. The third plot 815 shows the resulting signal on the XFAILB line 240. At time 1, the first secondary PMIC checks the XFAILB line and determines that it is not asserted. The first secondary PMIC then asserts is XFAILB pin for 10 us. At the end of the 10 us pulse, the first secondary PMIC again checks the XFAILB line and detects that it is not asserted, so the first secondary PMIC does not need to retransmit its pulse.

Then at time 2, the second secondary PMIC checks the XFAILB line and determines that it is asserted. The second secondary PMIC then waits a predetermined amount of time until time 3. At time 3, the second PMIC checks the XFAILB line and determines that it is now not asserted. The second secondary PMIC then asserts is XFAILB pin for 20 us. Then at time 4, the second secondary PMIC again checks the XFAILB line and detects that it is not asserted, so the second secondary PMIC does not need to retransmit its pulse.

By checking the XFAILB line before asserting an XFAILB pin, the secondary PMICs avoid incorrect interpretation of the secondary PMIC transmissions. This is illustrated in plot 815 where a 10 us pulse is detected and a 20 us pulse is separately detected.

Figure 9:
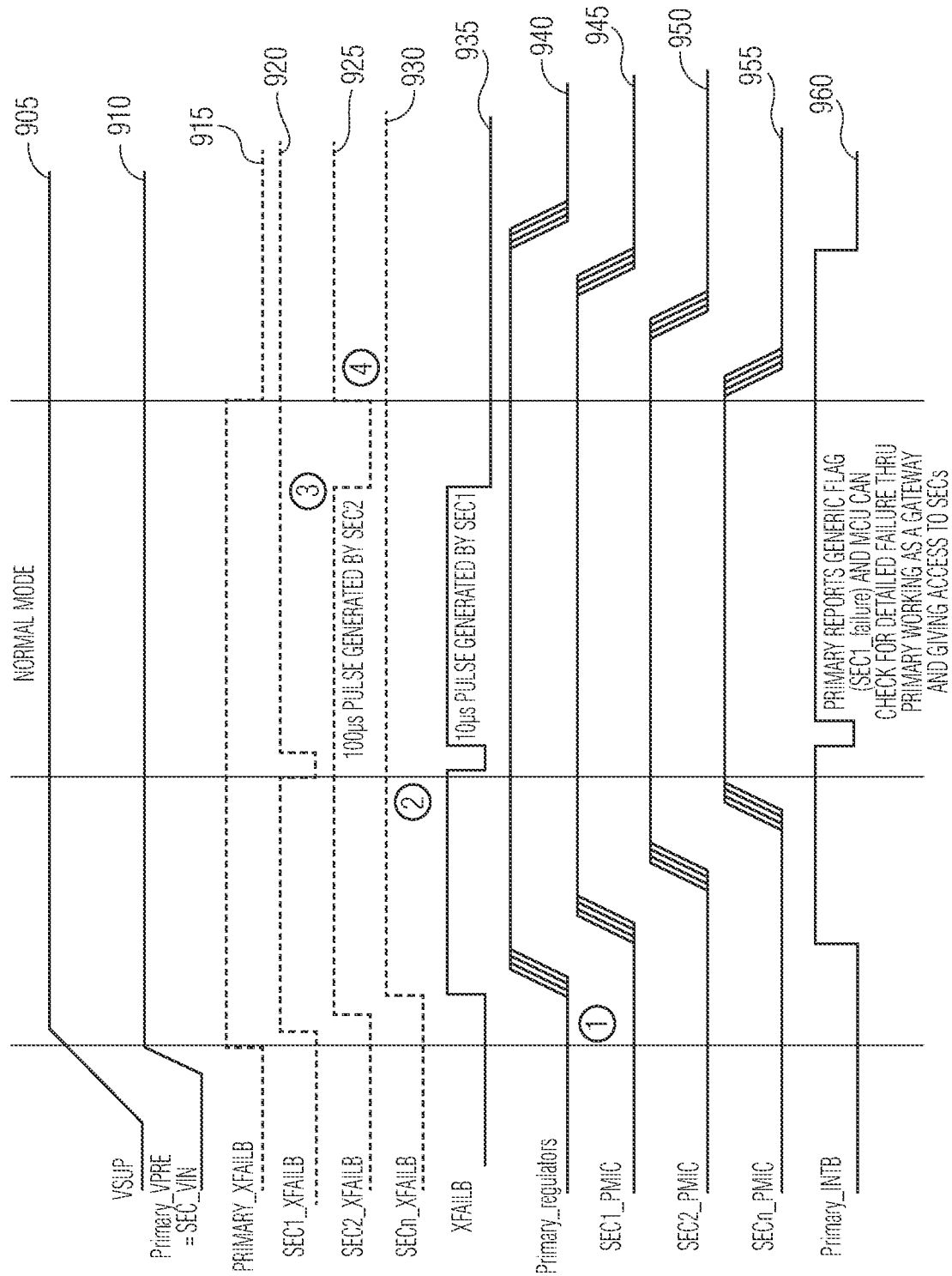
FIG. 9 shows various distributed power system signals and the power-up operation and the power-down operation.

FIG. 9 shows various distributed power system signals during the power-up operation and the power-down operation. FIG. 9 shows the following plots:

905: VSUP is the power received by the primary PMIC 205 such as VBAT;
910: Vpre which is the pre-regulation or secondary voltage output from the primary PMIC 205 that is the input power for each of the secondary PMICs;
915: signal asserted at the XFAILB pin of the primary PMIC;
920: signal asserted at the XFAILB pin of the first secondary PMIC;
925: signal asserted at the XFAILB pin of the second secondary PMIC;
930: signal asserted at the XFAILB pin of the nth secondary PMIC;
935: signal on the XFAILB line;
940: output of the primary PMIC indicating that the primary PMIC is operational;
945: output of the first secondary PMIC indicating that the first secondary PMIC is operational;
950: output of the second secondary PMIC indicating that the second secondary PMIC is operational;
955: output of the third secondary PMIC indicating that the third secondary PMIC is operational; and
960: interrupt signal on the interrupt line.

At time 1, the distributed power system starts to power-up. Before starting a power-up sequence, the XFAILB pin is maintained low by all the PMICs. This can be seen in plots 915-935. When all PMICs are ready to start their own power-up sequence, they will release individually their XFAILB pins as shown in plots 915-935 after time 1. The last secondary PMIC releasing the XFAILB will allow the power-up sequence to start. This will synchronize the timing of the start of all of the PMICs. Each individual PMIC will run its own power-up sequence at a time after the start up sequence is begun that is configured by OTP or some other method as shown in plots 940-955. This allows for an orderly sequential power-up of each of the PMICs. Once all of the PMICs are operational, the distributed power system enters a normal mode of operation. At a time 2, for example, a first secondary PMIC asserts its XFAILB pin indicating a failure by generating a 10 us pulse. The primary PMIC will detect this 10 us on the XFAILB line as shown in plot 935 and then generate an interrupt signal on the interrupt line as shown in plot 960. The MCU then may check for more detailed information regarding the failure of the first secondary PMIC as described above.

To initiate a power-down request for the distributed power system, the device requesting a complete power-down (either a primary or secondary PMIC) will assert the XFAILB pin longer than n×10 us which is the longest pulse width used by any of the secondary PMICs. This long pulse width differentiates from a failure indication This duration may configured by OTP in the primary PMIC and secondary PMICs to allow flexibility. Alternatively, these values may be programed into the PMICs in other ways.

In FIG. 9 at time 3 the second secondary PMIC asserts a 100 us pulse at its XFAILB pin show in plot 925. At time 4, the primary PMIC asserts its XFAILB pin. Accordingly, each of the PMICs in the power distribution system begin a sequential power-down sequence as shown in plots 940-955.

As a result, the XFAILB line may also be used to power-up and power-down the distributed power system.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A distributed power system, comprising:
a primary power management integrated circuit (PMIC) configured to receive a source voltage and connected to a primary communication bus, wherein the primary PMIC produces a secondary voltage on a voltage line,
wherein the primary PMIC communicates with a microcontroller unit (MCU) via the primary communication bus; and
a plurality of secondary PMICs connected to the primary PMIC via the voltage line, a secondary communication bus, and a fail line,
wherein each of the plurality of secondary PMICs that fails is configured to separately produce its own unique pulsed signal separately transmitted on the fail line having its own unique pulse width that indicates the failed secondary PMIC's identity to the primary PMIC.

2. The distributed power system of claim 1, wherein
the primary PMIC and secondary PMICs each include a fail pin connected to the fail line, and
the fail line is a single line.

3. The distributed power system of claim 1,
wherein the primary PMIC is configured to produce a reset signal on a reset line connected to the MCU.

4. The distributed power system of claim 1,
wherein the primary PMIC is configured to produce an interrupt signal on an interrupt line connected to the MCU.

5. The distributed power system of claim 1,
wherein each of the secondary PMICs is configured to communicate with the MCU via the secondary communication bus, the primary PMIC, and the primary communication bus.

6. The distributed power system of claim 1,
wherein the primary PMIC and the plurality of secondary PMICs include control logic configured to monitor the fail line and
wherein the control logic in each of the plurality of secondary PMICs produces to the unique pulsed signal.

7. The distributed power system of claim 1,
wherein the plurality of secondary PMICs are configured to:
  determine a status of the fail line before transmitting their own unique pulsed signal; and
  transmit their own unique pulsed signal when the fail line is not asserted.

8. The distributed power system of claim 1,
wherein the plurality of secondary PMICs are configured to:
  determine a status of the fail line before transmitting their own unique pulsed signal;
  wait a predetermined period of time when the fail line is asserted and then again detect the status of the fail line; and
  transmit their own unique pulsed signal when the fail line is not asserted.

9. The distributed power system of claim 1,
wherein the plurality of secondary PMICs are configured to determine a status of the fail line before transmitting their own unique pulsed signal.

10. The distributed power system of claim 9,
wherein the plurality of secondary PMICs are configured to wait a predetermined period of time when it is determined that the fail line is asserted before transmitting their own unique pulsed signal.

11. The distributed power system of claim 1,
wherein the plurality of secondary PMICs are configured to:
  determine a status of the fail line before transmitting their own unique pulsed signal;
  transmit their own unique pulsed signal when the fail line is not asserted;
  wait a first predetermined period of time when the fail line is asserted and then again detect the status of the fail line;
  transmit their own unique pulsed signal when the fail line is not asserted after waiting the first predetermined period of time; and
  determine the status of the fail line after transmitting their own unique pulsed signal after waiting the first predetermined period of time.

12. The distributed power system of claim 11,
wherein the plurality of secondary PMICs are configured to wait a second predetermined period of time when it is determined that the fail line is asserted after transmitting their own unique pulsed signal and then again transmit their own unique pulsed signal.

13. The distributed power system of claim 1,
wherein the primary PMIC and plurality of secondary PMICs are configured to power-down in a predetermined sequence when a pulsed signal having a unique power down pulse width is asserted on the fail line.

14. The distributed power system of claim 13,
wherein the unique power down pulse width is greater than the unique pulse widths of each of the plurality of pulsed signals produced by the plurality of secondary PMICs.

15. The distributed power system of claim 1,
wherein the primary PMIC and plurality of secondary PMICs are configured to:
  each assert a signal on the fail line; and
  power-up in a predetermined sequence when each of the primary PMIC and the plurality of PMICs deassert the signal on the fail line.

16. The distributed power system of claim 1, further comprising:
a register configured to store a fail flag for each of the plurality of secondary PMICs, wherein the primary PMIC is configured to determine a pulse width of any pulsed signals on the fail line and set a fail flag in the register corresponding to the unique pulse width transmitted by any of the secondary PMICs that failed.

17. The distributed power system of claim 16,
wherein the primary PMIC is configured to send an interrupt signal to the MCU when a fail flag is set in the register.

18. The distributed power system of claim 17, wherein
each of the secondary PMICs is configured to communicate with the MCU via the secondary communication bus, the primary PMIC, and the primary communication bus, and
the MCU is configured to obtain failure status of any of the secondary PMICs that failed via the primary communication bus, primary PMIC, and secondary communication bus.

19. The distributed power system of claim 1, further comprising:
a register bank configured to store a fail flag and failure information for each of the plurality of secondary PMICs,
wherein the primary PMIC is configured to determine a pulse width of any pulsed signals on the fail line and set a fail flag in the register bank corresponding to any of the secondary PMICs that failed, and
wherein the primary PMIC is configured to read failure information corresponding to any of the secondary PMICs that failed and store it in the register bank.

20. The distributed power system of claim 19, wherein
the primary PMIC is configured to send an interrupt signal to the MCU when a fail flag is set in the register bank, and
wherein the MCU obtains failure status from the primary PMIC via the primary communication bus.

21. A distributed power system, comprising:
a primary power management integrated circuit (PMIC) configured to receive a source voltage and connected to a primary communication bus, wherein the primary PMIC produces a secondary voltage on a voltage line;
wherein the primary PMIC communicates with a microcontroller unit (MCU) via the primary communication bus;
a plurality of secondary PMICs connected to the primary PMIC via the voltage line, a secondary communication bus, and a fail line;
wherein each of the plurality of secondary PMICs that fails is configured to produce its own unique pulsed signal on the fail line having its own unique pulse width that indicates the failed secondary PMIC's identity to the primary PMIC;

wherein the primary PMIC and the plurality of secondary PMICs include control logic configured to monitor the fail line; and wherein the control logic in each of the plurality of secondary PMICs produces the unique pulsed signal.

22. A distributed power system, comprising:

a primary power management integrated circuit (PMIC) configured to receive a source voltage and connected to a primary communication bus, wherein the primary PMIC produces a secondary voltage on a voltage line;

wherein the primary PMIC communicates with a microcontroller unit (MCU) via the primary communication bus;

a plurality of secondary PMICs connected to the primary PMIC via the voltage line, a secondary communication bus, and a fail line;

wherein each of the plurality of secondary PMICs that fails is configured to produce its own unique pulsed signal on the fail line having its own unique pulse width that indicates the failed secondary PMIC's identity to the primary PMIC;

a register configured to store a fail flag for each of the plurality of secondary PMICs;

wherein the primary PMIC is configured to determine a pulse width of any pulsed signals on the fail line and set a fail flag in the register corresponding to the unique pulse width transmitted by any of the secondary PMICs that failed.

* * * * *